May 9, 1933.     O. W. MARTHA     1,907,991
HOLLOW HANDLE FOR COFFEEPOTS AND THE LIKE
Filed Dec. 6, 1932
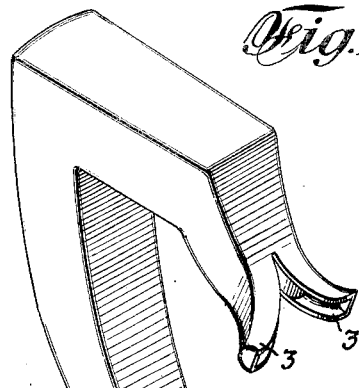
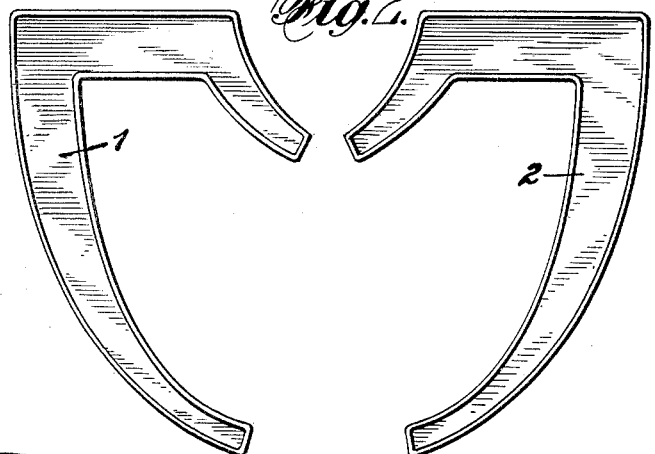
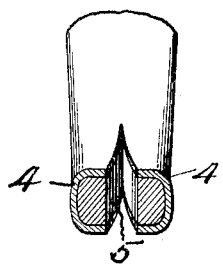
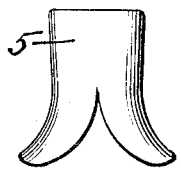
INVENTOR
OSCAR W. MARTHA
BY
Mitchell & Bechert
ATTORNEYS Patented May 9, 1933

1,907,991

UNITED STATES PATENT OFFICE

OSCAR W. MARTHA, OF WALLINGFORD, CONNECTICUT, ASSIGNOR TO R. WALLACE & SONS MFG. CO., OF WALLINGFORD, CONNECTICUT, A CORPORATION OF CONNECTICUT

HOLLOW HANDLE FOR COFFEEPOTS AND THE LIKE

Application filed December 6, 1932. Serial No. 645,884.

My invention relates to certain new and useful improvements in hollow metallic handles for metallic coffee pots and the like. It consists of certain novel and useful structural features hereinafter described.

The main object of my invention is to provide a handle which is simple, economical, strong and durable, and which when attached to a coffee pot, for example, will conduct the heat therefrom so slowly that the grip portion of the handle remains relatively cool. Heretofore to accomplish this result, it has been common practice to provide insulated tubular sockets at each end of the grip portion to prevent the heat of the coffee pot from being conducted to the handle so as to make it uncomfortably hot.

In the drawing—

Fig. 1 is a perspective view of the finished handle;

Fig. 2 is a view of the inside of two separate shells from which the handle is formed and before the said shells are assembled;

Fig. 3 is a section on the line 3—3 of Fig. 1;

Fig. 4 is a plan view of a detail.

In that particular form of the invention shown herein, 1—2 represent two shells, each being struck up from thin sheet metal preferably of a single length and channeled longitudinally from end to end. The ends of each shell are drawn down or tapered for the purpose hereinafter described. These drawn down ends of each shell are bent or curved outwardly so that when the two shells are placed together edge to edge, the intermediate contacting portions of said shells will form the grip portion of the handle while the tapered down ends will diverge and form the branches of forks 3—3, 4—4. 5 is a fillet which is located in the crotch of the fork. This fillet is split at one end to form a fishtail, the two parts or branches of said fishtail extending into and hidden within the grooved portions of the fork ends to reinforce and support the same, the unslitted portion of the fillet extending into the adjacent end of the grip to close the same. One of these fillets is preferably provided at each end of the grip portion of the handle. These fillets perform a double function, namely, they close the ends of the hollow grip portion so that dish-water or foreign matter cannot enter the chamber within the hollow grip to the injury of the same and they also adequately reinforce the small, thin and relatively weaker branches of each fork. In view of the fact that it is important that the forked ends of the handle shall be drawn down as much as practicable for the purpose hereinafter described, it is highly important that the same shall be properly reinforced. It is also desirable in the interset of economy to use as thin a gauge of metal for the purpose of forming the shells as may be safely done. The use of fish-tail fillets permits the forked ends to be tapered down to a greater degree than would otherwise be possible and also permits the use of a thinner gauge of metal than it would otherwise be possible to employ with safety. When the handle is finished, the tips of the forked ends are secured to the metallic side of the vessel to be supported thereby. If this vessel should become very hot as in the case of a coffee pot, the heat thereof, by reason of the relative smallness and thinness of the forked ends as compared with size of the grip portion of the handle, is conducted very slowly from the pot to the handle. Furthermore, since air may flow freely through the space between the forked ends and entirely around the latter, said air circulation has a cooling effect tending to further lessen the amount of heat transmitted to the handle grip.

While I have stated that each shell is preferably made of one continuous strip of metal, this, of course, is not essential in all cases. I have shown my invention only in its preferred form, being aware that reasonable changes and modifications can be made without departing from the spirit or scope of the invention.

What I claim is:

1. A metallic handle for a metallic coffee pot and the like comprising, two elongated metallic shells channeled throughout their length and tapered down at one end, said shells being secured together edge to edge for a portion of their length to form a hollow grip portion, the tapered down ends of said shells being separated and spread apart to form two forked branches integral therewith to secure that end of said handle to said pot, and a fillet secured in the channeled portion of said shells in the crotch of said fork to close the opening into said hollow handle and to reinforce the walls of said channeled shells in that zone.

2. A metallic handle for a metallic coffee pot and the like comprising, two elongated metallic shells channeled throughout their length and tapered down at both ends, said shells being secured together edge to edge for a portion of their length to form a hollow grip portion, the tapered down ends of said shells at both ends of said grip portion being separated and spread apart to form two forked branches at each end of said grip to secure both ends of said handle to said pot, and a fillet secured in the channeled portion of said shells at the crotch of said fork at each end of said grip, each fillet having a fish-tail end extending into and secured in the opposed channels of the tapered down forked ends of the handle to reinforce said handle in the zone of said crotch.

3. A metallic handle for a metallic coffee pot and the like comprising, two elongated metallic shells channeled throughout their length and tapered down at their ends, said shells being secured together edge to edge for a portion of their length to form a hollow grip portion, both tapered down channeled ends of said grip portion being spread apart to form connector forks at said ends thereof, and a fillet secured in the crotch of each fork and extending partly into said grip and partly into the channeled branches of said forks to close and reinforce each grip end and to also reinforce the branches of each fork.

OSCAR W. MARTHA.